(12) United States Patent
Blais

(10) Patent No.: US 6,918,126 B1
(45) Date of Patent: Jul. 12, 2005

(54) METHOD AND APPARATUS FOR CREATING AND ENFORCING PROTECTED SYSTEM LEVEL JAVA CODE

(75) Inventor: Marc Noel Blais, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 09/657,501

(22) Filed: Sep. 8, 2000

(51) Int. Cl.[7] ................................................. G06F 9/00
(52) U.S. Cl. ...................... 719/332; 717/116; 717/118; 717/148; 717/162; 717/163; 717/165; 717/166; 713/164; 713/165; 713/166; 713/200
(58) Field of Search ......................... 719/332; 717/116, 717/118, 147–148, 162–167, 114, 150; 713/164–167, 189–190, 193, 200; 709/1–108

(56) References Cited

U.S. PATENT DOCUMENTS

| | | | | |
|---|---|---|---|---|
| 5,913,064 A | * | 6/1999 | Chen ........................... | 717/108 |
| 5,966,702 A | * | 10/1999 | Fresko et al. ................... | 707/1 |
| 6,044,467 A | * | 3/2000 | Gong ........................... | 713/200 |
| 6,381,734 B1 | * | 4/2002 | Golde et al. .................. | 717/165 |
| 6,397,384 B1 | * | 5/2002 | Briggs ......................... | 717/165 |
| 6,594,708 B1 | * | 7/2003 | Slaughter et al. ........... | 709/315 |
| 6,601,114 B1 | * | 7/2003 | Bracha et al. ............... | 719/332 |
| 6,708,276 B1 | * | 3/2004 | Yarsa et al. .................. | 713/201 |
| 6,714,991 B1 | * | 3/2004 | Bak et al. .................... | 719/316 |

OTHER PUBLICATIONS

Java "Dynamic class loading" 1999, pp. 1–13.*
Taivalsaari, "Implementing a Java Virtual Machine in the Java Programming Language" Mar. 1998, pp. 1–23.*
Karaorman, "A Reflective Java Library to Support Design by Contract", Dec. 1998, pp. 1–16.*

* cited by examiner

*Primary Examiner*—Meng-Al T. An
*Assistant Examiner*—Phuong N. Hoang
(74) *Attorney, Agent, or Firm*—Martin & Associates, LLC; Derek P. Martin

(57) ABSTRACT

According to the preferred embodiments, an object oriented mechanism and method allow creating system level Java code that is protected, and therefore cannot be accessed or extended by unauthorized users or programs. Several new tests are performed during loading, linking, and initialization of a class that assure that the class is as the operating system expects. In addition, one or more runtime tests may be performed to prevent programs from getting into the Java system level code via a runtime "back door." By providing additional tests when classes are loaded and when certain types of methods and functions are invoked at runtime, the Java system level code is protected from unauthorized access and use.

42 Claims, 13 Drawing Sheets java.lang.reflect.Method.invoke()
java.lang.reflect.Field.get()
java.lang.reflect.Field.getBoolean()
java.lang.reflect.Field.getByte()
java.lang.reflect.Field.getChar()
java.lang.reflect.Field.getShort()
java.lang.reflect.Field.getInt()
java.lang.reflect.Field.getLong()
java.lang.reflect.Field.getFloat()
java.lang.reflect.Field.getDouble()
java.lang.reflect.Field.set()
java.lang.reflect.Field.setBoolean()
java.lang.reflect.Field.setByte()
java.lang.reflect.Field.setChar()
java.lang.reflect.Field.setShort()
java.lang.reflect.Field.setInt()
java.lang.reflect.Field.setLong()
java.lang.reflect.Field.setFloat()
java.lang.reflect.Field.setDouble()
java.lang.reflect.Constructor.newInstance()

FIG. 11

AllocObject
GetMethodID
GetStaticMethodID
GetFieldIT
GetStaticFieldID
Priv_NewObjectA
Priv_NewObjectV

FIG. 12

METHOD AND APPARATUS FOR CREATING AND ENFORCING PROTECTED SYSTEM LEVEL JAVA CODE

BACKGROUND OF THE INVENTION

1. Technical Field

This invention generally relates to the data processing field. More specifically, this invention relates to system level code, such as operating system code, in a computer system.

2. Background Art

Since the dawn of the computer age, computer systems have evolved into extremely sophisticated devices, and computer systems may be found in many different all settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects typically will speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modem object oriented programming language that has become very popular in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

Due to the platform independent nature of programs written in Java, initial efforts were made to program applications and applets using Java. However, more recent efforts have recognized that Java could be used to write system level code (such as operating system code) that is platform dependent. The problem with writing system level code in Java is that the Java programming language currently does not support running code in a protected mode, which is required for most system level code. Without an apparatus and method for generating system level Java code that is protected, a clever programmer could find a way to access system level Java code in unauthorized and inappropriate ways.

DISCLOSURE OF INVENTION

According to the preferred embodiments, an object oriented mechanism and method allow creating system level Java code that is protected, and therefore cannot be accessed or extended by unauthorized users or programs. Several new tests are performed during loading, linking, and initialization of a class that assure that the class is as the operating system expects. In addition, one or more runtime tests may be performed to prevent programs from getting into the Java system level code via a runtime "back door." By providing additional tests when classes are loaded and when certain types of methods and functions are invoked at runtime, the Java system level code is protected from unauthorized access and use.

BRIEF DESCRIPTION OF DRAWINGS

The preferred exemplary embodiments of the present invention will hereinafter be described in conjunction with the appended drawings, where like designations denote like elements, and:

FIG. 11 is a list of Java-defined reflection methods that allow accessing dynamically-defined classes;

FIG. 12 is a list of Java Native Interface (JNI) functions that can access Java classes from outside the Java program;

BEST MODE FOR CARRYING OUT THE INVENTION

Figure 1:
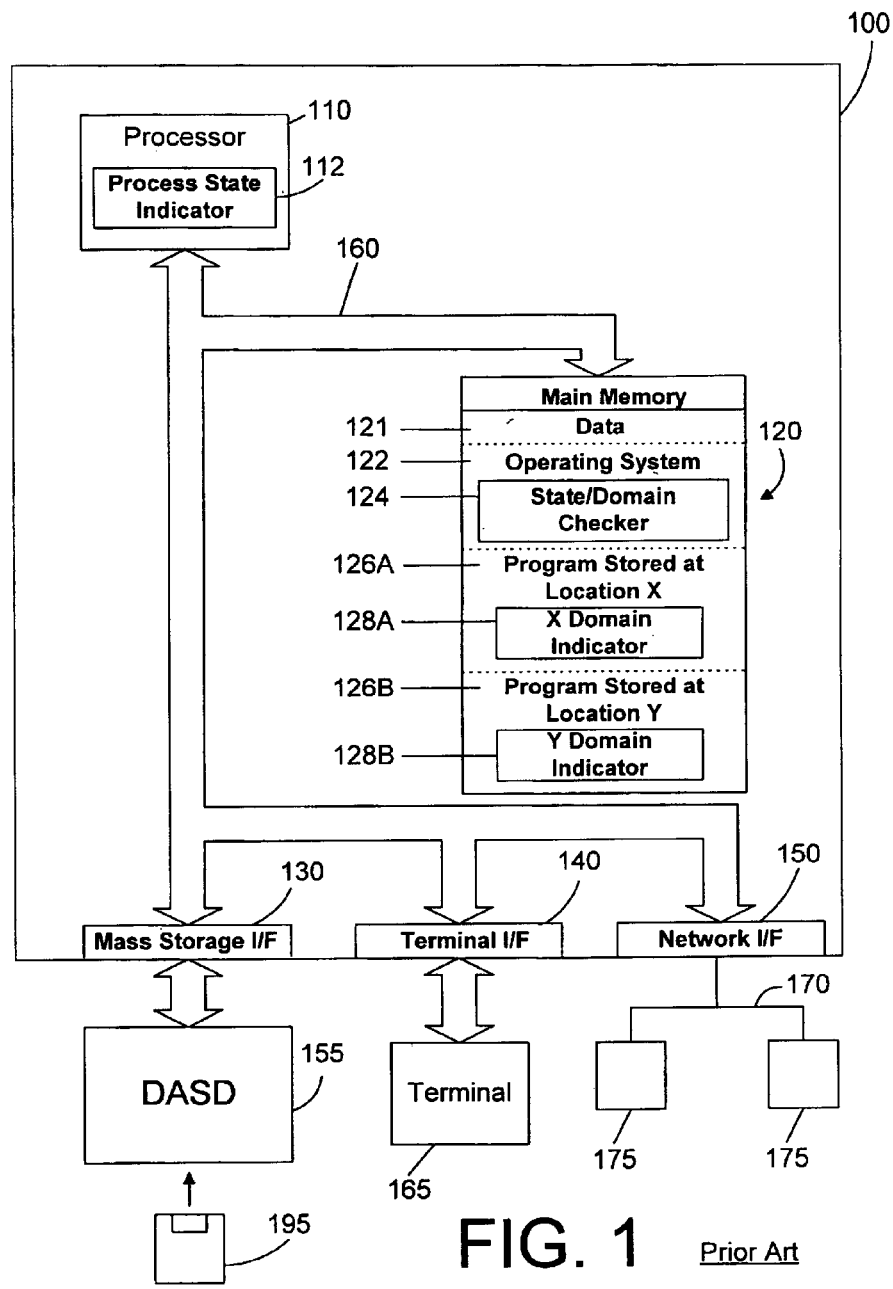
FIG. 1 is a block diagram of a prior art apparatus showing a prior art method for protecting system level code from unauthorized access at runtime.

The present invention relates to object oriented programming techniques. For those individuals who are not generally familiar with object oriented programming, the Overview section below presents many of the concepts that will help to understand the invention.

1. Overview

Object Oriented Technology v. Procedural Technology

Object oriented programming is a method of implementation in which programs are organized as cooperative collections of objects, each of which represents an instance of some class, and whose classes are all members of a hierarchy of classes united via inheritance and implementation relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code.

There are many computer languages that presently support object oriented programming techniques. For example, Smalltalk, Object Pascal, C++ and Java are all examples of programming languages that support object oriented programming to one degree or another.

Prior Art Apparatus for Protecting System Level Code

Referring to FIG. 1, a computer system 100 in accordance with the prior art is an AS/400 computer system manufactured and marketed by the IBM Corporation. Computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 121, an operating system 122, and one or more programs stored at a specific memory location. In FIG. 1, a first program 126A is stored at location X, and a second program 126B is stored at location Y. Operating system 122 includes a state/domain checker 124 that enforces protections in system level code by assuring that the current process state is compatible with the domain of the program being called. Each of programs 126A and 126B have corresponding domain indicators 128A and 128B, respectively, that indicate the domain of the program. These indicators are typically stored at a predetermined offset from the beginning of the storage location of the program. In the specific example of FIG. 1, we assume that X domain indicator 128A specifies that the program stored at location X is a private domain program, while Y domain indicator 128B indicates that the program stored at location Y is a public domain program. A private domain program is a program or program portion, such as operating system code, that can only be accessed in a specific and defined way. Generally, a private domain program can only be accessed by a program running in system state. A private domain program typically defines one or more system programming interfaces (SPIs) that may be called by other portions of the operating system. A public domain program, in contrast, typically defines one or more application programming interfaces (APIs) that may be called by any other program. In the prior art AS/400 computer system, the state of a process (or thread) is determined by one or more bits in a system processor register, which is referred to in FIG. 1 as a process state indicator 112. If the process state indicator for a program indicates it is running in system state, it may access private domain programs. If the process state indicator indicates that the program is not running in system state, it may not access private domain programs, but may still access public domain programs. Note that this method for protecting system level code requires bits in a processor register, which means that this protection scheme is partially hardware-based. Before operating system 122 grants access to a program (such as program 128A), the operating system 122 checks the domain indicator (128B) of the program to determine the program's domain. If the program is a public domain program, operating system 122 grants access to the program. However, if the program is a-private domain program (such as program 128A), operating system 122 checks the process state indicator 112 for the caller process and only grants access if the caller process is running in system state mode.

Data 121 represents any data that serves as input to or output from any program in computer system 100. Operating system 122 is a multitasking operating system known in the industry as OS/400.

Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160. In addition, operating system 122 enforces protections so that only programs running in a system state can access private domain programs.

Terminal interface 140 is used to directly connect one or more terminals 165 to computer system 100. Terminal 165 may be a simple display device, such as a monitor, or may be a fully programmable workstation, and is used to allow system administrators and users to communicate with computer system 100. Network interface 150 allows computer system 100 to send and receive data to and from any computer system 175 that is coupled to the network 170 to which the computer system may be connected.

By maintaining the domain table 124 and by checking the system state of each process that tries to access a private domain program by checking its process state indicator 112 in the appropriate processor register, the operating system 122 of the prior art achieves the desired protection to assure that only programs running in system state may access private domain programs.

Prior Art Method for Loading and Using Java Classes

Figure 2:
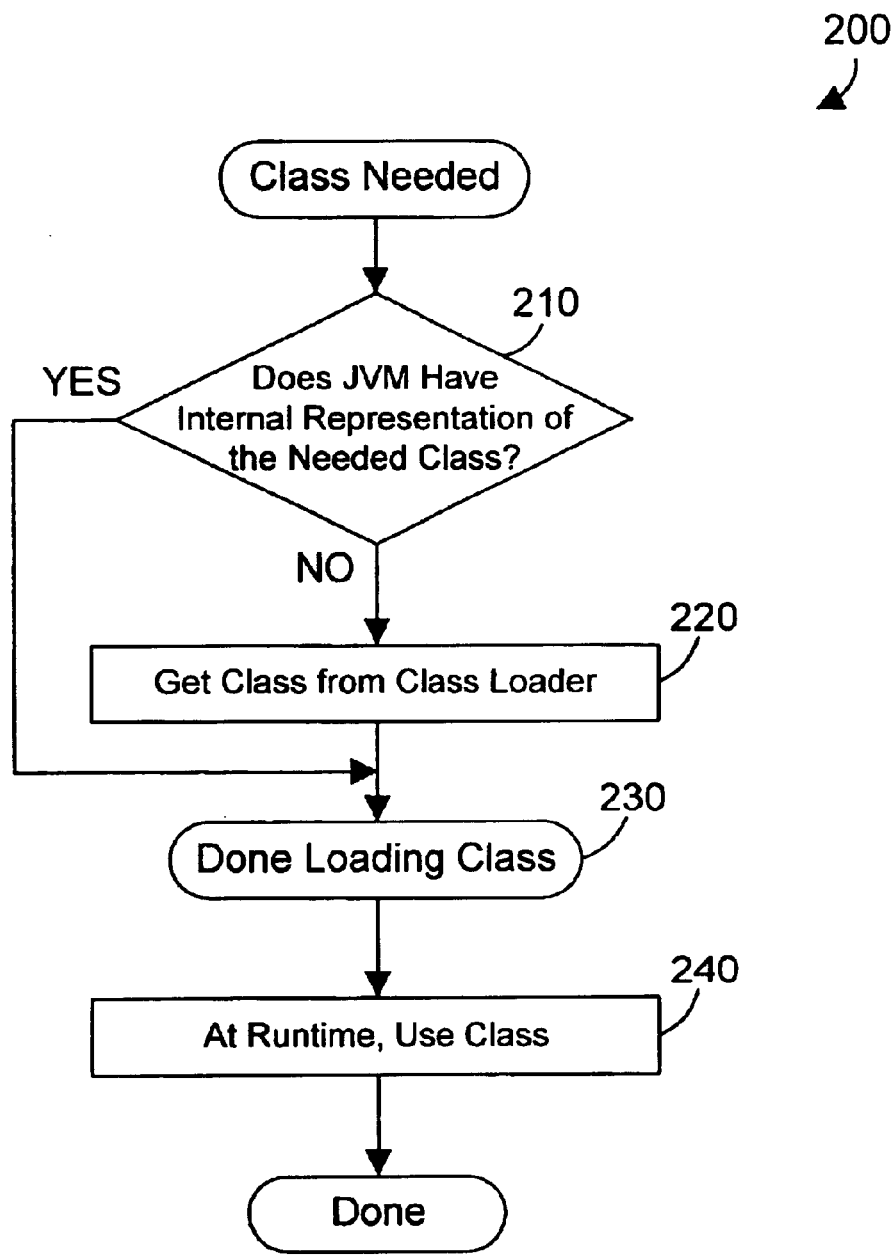
FIG. 2 is a flow diagram showing the steps of a prior art method for accessing a class that is needed.

One prior art method for loading and using Java classes for the apparatus 100 of FIG. 1 is shown as method 200 in FIG. 2. Method 200 is run when a class is needed. First, method 200 checks to see if the Java Virtual Machine (JVM) has an internal representation of the needed class (step 210). If so (step 210=YES), the class is already available, and need not be loaded, so method 200 is done loading the class (step 230). At runtime, the class is then used (step 240). If, however, the JVM does not have an internal representation of the needed class (step 210=NO), method 200 gets the needed class from a class loader (step 220). The detailed operation of the prior art class loader is shown in FIG.3.

Figure 3:
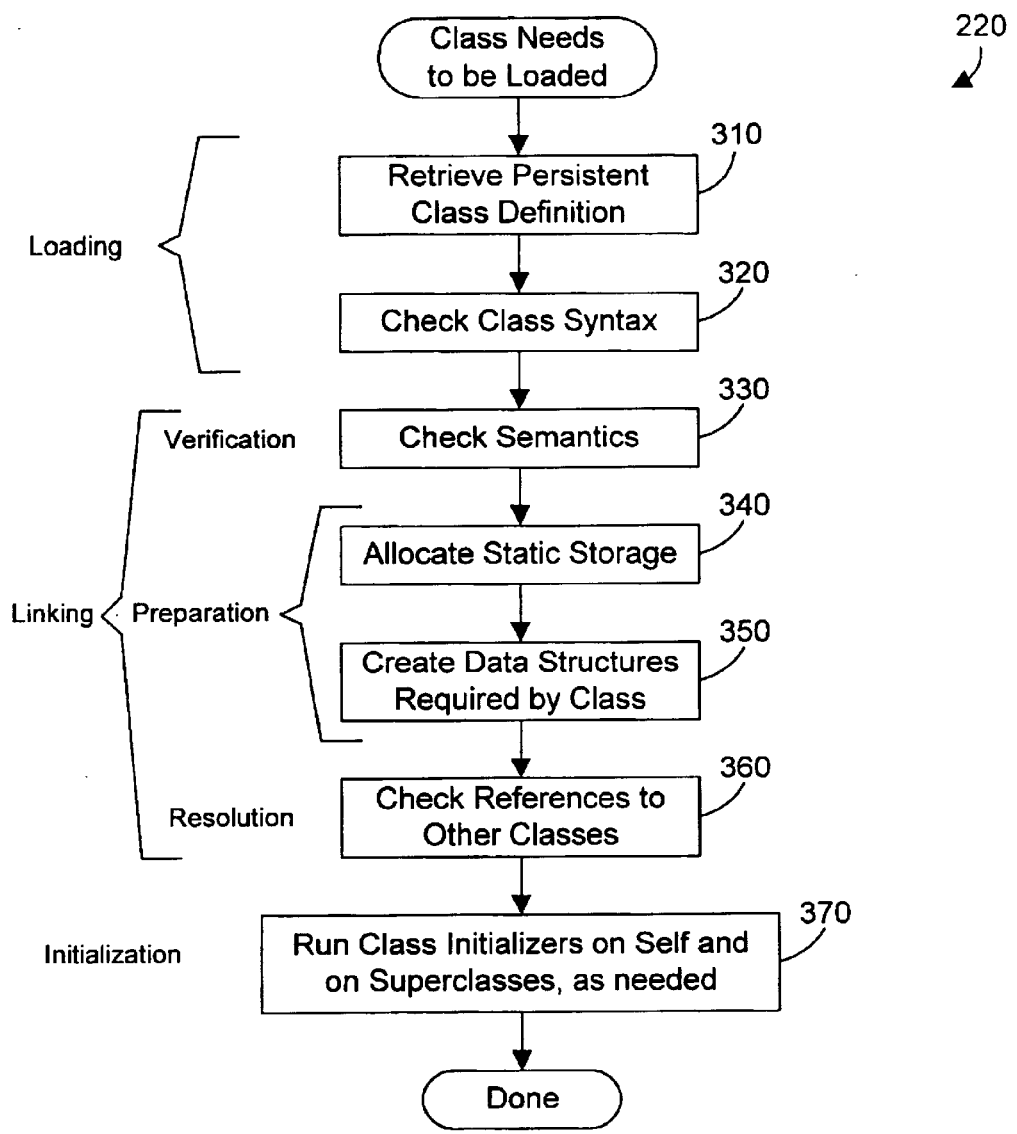
FIG. 3 is a flow diagram of a prior art method for a class loader to perform the step of loading a class in step 220 of FIG. 2.

Step 220 of FIG. 1 is expanded into a series of steps in FIG. 3 that are performed when a class needs to be loaded. As is known in the art, class loading may be broken down into defined phases, such as loading, linking, and initialization. The linking phase may include verification, preparation, and resolution phases. These phases are shown by the text notations on the left side of FIG. 3. The loading phase includes the steps of retrieving a persistent class definition (step 310) and checking class syntax (step 320). Retrieving a persistent class definition in step 310 represents retrieving the class file from a persistent store. Checking the class syntax in step 320 typically checks to make sure the class file does not contain any syntax errors, which refers to statements that are not recognized by the Java programming language. Next we go to the linking phase, which includes steps 330–360. During the verification part of linking, the semantics of the class file are checked (step 330) to make sure the class code is only performing operations allowed by the Java programming language. Next, we go to the preparation phase, which allocates static storage for the class (step 340), and creates any data structures required by the class (step 350). For example, if the class file defines a static array, step 340 creates the array for the class. Next we move on to the resolution phase, which checks references to other classes (step 360). In the prior art, the resolution phase in step 360 may be performed when a class is loaded, or may instead performed when a method on the class is invoked at runtime. Thus, while step 360 is shown as a part of the class linking phase, it could also be performed after class loading, linking, and initialization by waiting until runtime and resolving only those classes that are referenced at runtime.

Typically, prior art JVMs perform class resolution at runtime rather than when classes are being loaded, because step 360 typically needs to be performed recursively to load all classes that a particular class references, and so on for classes that each referenced class references, and so forth. As a result, an attempt to resolve a class may result in a great number of classes being loaded. Due to the probability that not all classes will actually be needed when the program runs, the resolution phase is typically performed at runtime. In other words, when a class is referenced at runtime, it is then resolved. While this may slightly decrease the runtime performance of the system by having to load the required classes at runtime, it usually decreases the overall time required to load and run classes because not all of the classes referenced will be invoked at runtime.

Once the linking phase is complete, the initialization phase is performed by running class initializer methods on the class that needs to be loaded and on any superclasses of the class that needs to be loaded (step 370). Initialization is performed to put the class in a known initial state. At this point, the class has been loaded, linked, and initialized, so prior art method 220 for loading a class is done.

The prior art method 200 for accessing a needed class by a JVM has no way to distinguish between classes that represent system level code that needs to be protected and classes that represent other code that may be freely accessed. In addition, the prior art method 220 for loading a class has no way to distinguish between classes that represent system level code that needs to be protected and classes that represent other code. For this reason, the prior art apparatus and methods cannot be used to protect system level code written in Java In short, any user could directly access system level code by appropriately extending or implementing interfaces of system level classes. This free access to system level code is not acceptable, so the use of system level code written in Java has been limited.

2. Detailed Description

The preferred embodiments provide an enhancement over the prior art by implementing system level protections that cannot be violated by a programmer that wants to gain unauthorized access to system level code. System classes are created that include state data that uniquely identifies each protected class. A new class loader performs multiple checks when a class is loaded to assure that only authorized classes or programs are allowed to access protected classes. In addition, runtime checks are performed to assure that only authorized programs are allowed to access protected classes.

These checks provide the protection required to allow implementing system level code in Java classes.

Figure 4:
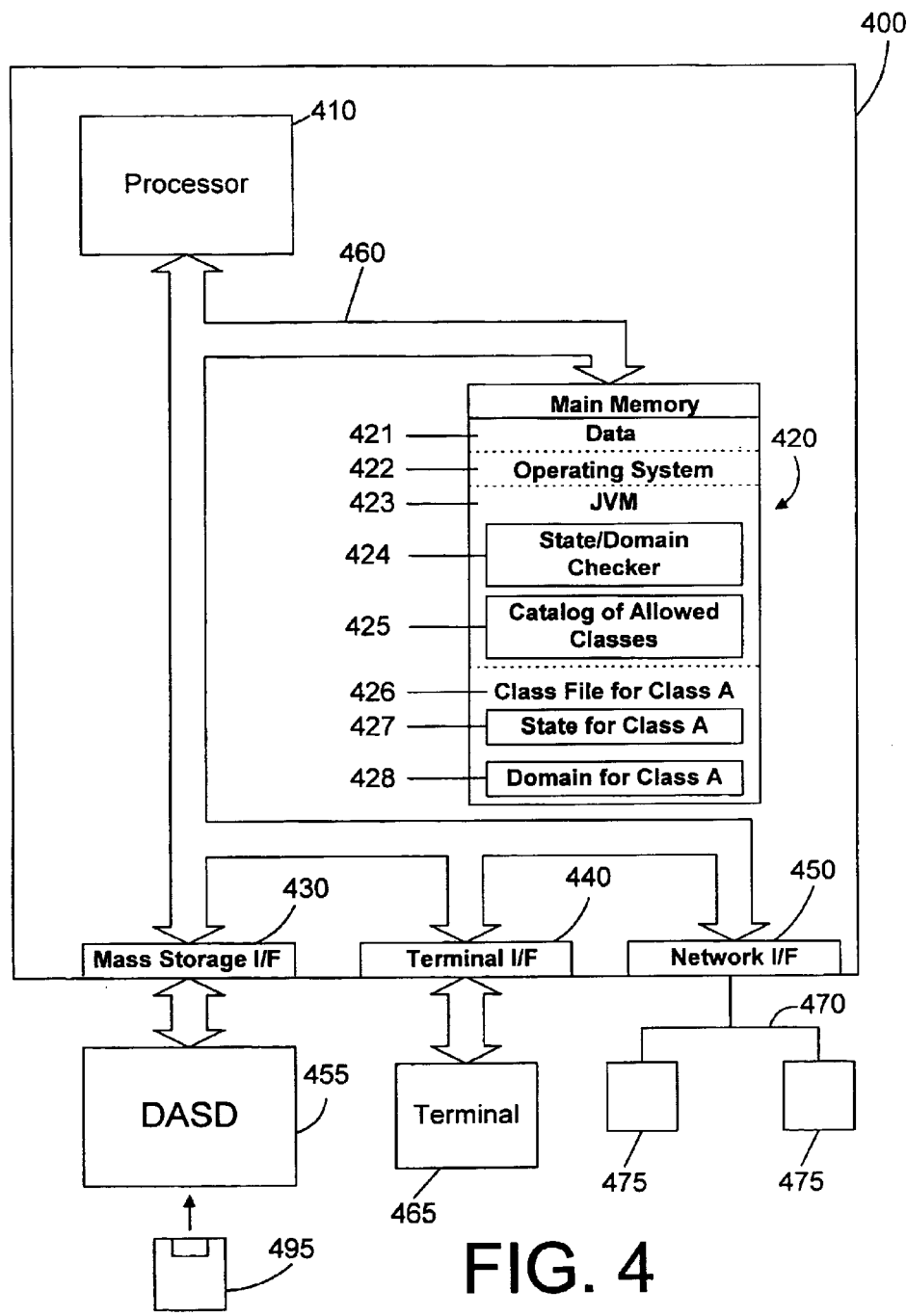
FIG. 4 is a block diagram of an apparatus in accordance with the preferred embodiments.

Referring to FIG. 4, a computer system 400 in accordance with the preferred embodiments is an AS/400 computer system. Computer system 400 comprises a processor 410 connected to a main memory 420, a mass storage interface 430, a terminal interface 440, and a network interface 450. These system components are interconnected through the use of a system bus 460. Mass storage interface 430 is used to connect mass storage devices (such as a direct access storage device 455) to computer system 400. One specific type of direct access storage device is a floppy disk drive, which may store data to and read data from a floppy diskette 495.

Note that many of the designated items of FIG. 4 correspond to designated items in FIG. 2. These designated items in FIG. 4 that have corresponding designated items in FIG. 2 may be the same as their prior art counterparts in FIG. 2. However, the preferred embodiments also extend to implementations of these designated items in FIG. 4 that are different than those used in the prior art as shown in FIG. 2.

Main memory 420 in accordance with the preferred embodiments contains data 421, an operating system 422, a Java Virtual Machine (JVM) 423, and one or more class files 426. Computer system 400 utilizes well known virtual addressing mechanisms that allow the programs of computer system 400 to behave as if they only have access to a large, single storage entity instead of access to multiple, smaller storage entities such as main memory 420 and DASD device 455. Therefore, while data 421, operating system 422, JVM 423, and class files 426 are shown to reside in main memory 420, those skilled in the art will recognize that these items are not necessarily all completely contained in main memory 420 at the same time. It should also be noted that the term "memory" is used herein to generically refer to the entire virtual memory of computer system 400.

Data 421 represents any data that serves as input to or output from any program in computer system 400. Operating system 422 is a multitasking operating system known in the industry as OS/400. However, one skilled in the art will appreciate that the present invention may be employed using any suitable operating system.

JVM 423 includes a state/domain checker 424 that checks to assure that only authorized classes and programs are allowed to access protected system level Java classes. In the preferred embodiments, state/domain checker 424 performs a plurality of checks when each class is loaded, and also provides a plurality of checks at runtime when certain methods or functions are invoked, as described in more detail below. Note that in the preferred embodiments, the state/domain checker 424 is located within the JVM 423 rather than within the operating system, as is known in the prior art. However, the state/domain checker could also be located within the operating system or elsewhere within main memory 120 within the scope of the preferred embodiments.

The JVM 423 also includes a catalog of allowed classes 425. This catalog of allowed classes is generated when the JVM is built, and includes all protected classes. While catalog of allowed classes 425 is shown to reside in main memory 420, this catalog 425 in memory is preferably copied from a persistent data store.

Each class file 426 includes state data that indicates its corresponding state 427 and domain 428. In the preferred embodiments, the state 427 for a class indicates that the class is protected if the class implements a SystemState interface. This interface is an abstract interface with no internal implementation, but essentially serves as a flag to signal to the state/domain checker 424 whether the class is protected or not. Similarly, the domain 428 for a class indicates that the class is protected if the class implements a PrivateDomain interface. This interface is also an abstract interface with no internal implementation that serves as a flag to signal to the state/domain checker 424 whether the class is protected or not. Thus, a "protected class" as used herein is a class that implements one or both of the SystemState and PrivateDomain interfaces. In accordance with prior art AS/400 terminology, a program is in a system state if it is allowed to directly access operating system functions. A program is a private domain program if it resides at an address that other programs that are not system state cannot access. The preferred embodiments extend these concepts of private domain and system state to the Java realm, defining special abstract interfaces that may be implemented to indicate the appropriate state 427 and domain 428 for the corresponding class 426. Note that other ways of indicating that a class is a system state class or private domain class may be used within the scope of the preferred embodiments.

Processor 410 may be constructed from one or more microprocessors and/or integrated circuits. Processor 410 executes program instructions stored in main memory 420. Main memory 420 stores programs and data that processor 410 may access. When computer system 400 starts up, processor 410 initially executes the program instructions that make up operating system 422. Operating system 422 is a sophisticated program that manages the resources of computer system 400. Some of these resources are processor 410, main memory 420, mass storage interface 430, terminal interface 440, network interface 450, and system bus 460.

Although computer system 400 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 410. However, those skilled in the art will appreciate that the present invention applies equally to computer systems that simply use I/O adapters to perform similar functions.

Terminal interface 440 is used to directly connect one or more terminals 465 to computer system 400. Terminal 465 may be a simple display device, such as a monitor, or may be a fully programmable workstation, and is used to allow system administrators and users to communicate with computer system 400

Network interface 450 allows computer system 400 to send and receive data to and from any computer system 475 that is coupled to the network 470 to which the computer system may be connected. This network 470 may be a local area network (LAN), a wide area network (WAN), the Internet, or any other suitable network. Many different network protocols can be used to implement a network. These protocols are specialized computer programs that allow. computers to communicate across a network. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 495 of FIG. 4) and CD ROM, and transmission type media such as digital and analog communications links.

Figure 5:
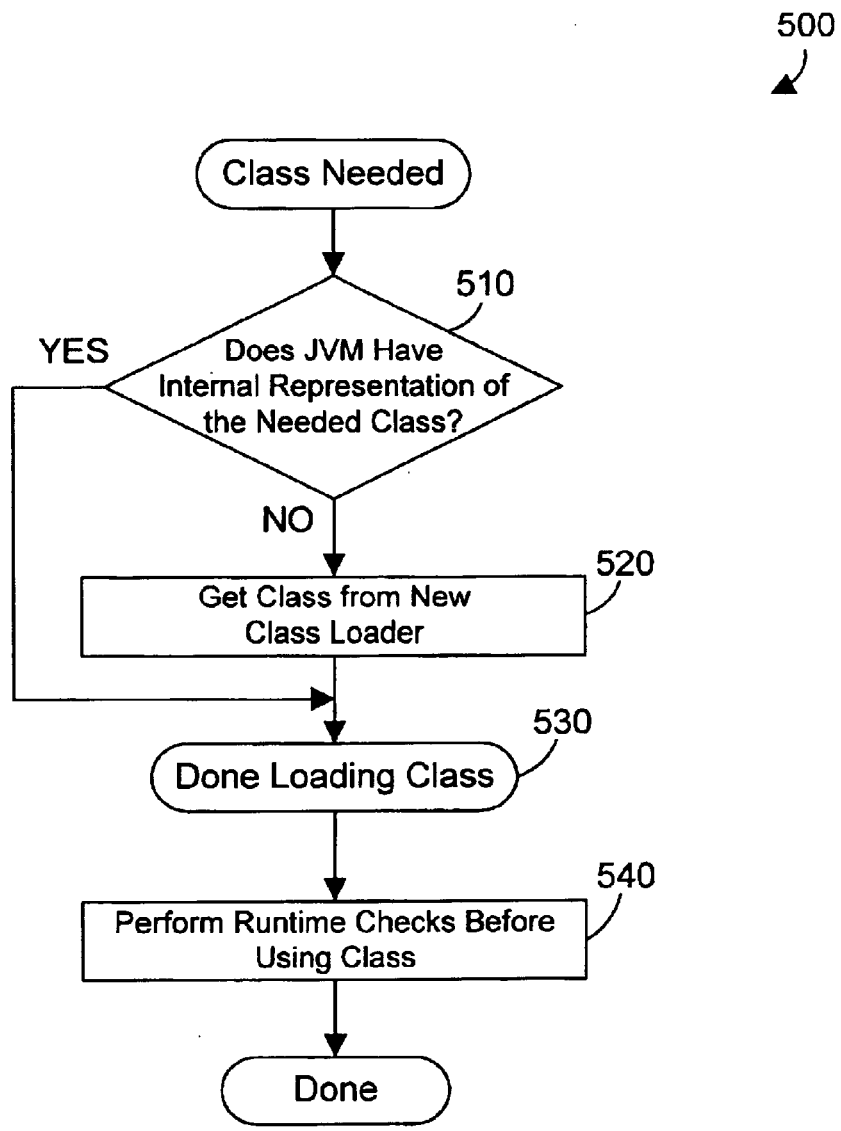
FIG. 5 is a flow diagram showing the steps of a method in accordance with the preferred embodiments for accessing a class that is needed.

Referring now to FIG. 5, a method 500 shows the steps to load and use system level Java classes in accordance with the preferred embodiments. Note that method 500 is similar in some ways to method 200 of FIG. 2, but includes a call to a new class loader in step 520, and performs runtime checks before using a class in step 540. Method 500 is performed when a class is needed If the JVM already has an internal representation of the needed class (step 510=YES), the JVM does not need to load the class, so the loading of the class is done (step 530). If, however, the JVM does not have an internal representation of the class (step 510=NO), method 500 gets the needed class from a new class loader (step 520), the details of which are described below with reference to FIG. 6. Once method 500 is done loading the class (step 530), method 500 performs runtime checks before using the class (step 540) to assure that only authorized code can call the protected Java classes.

Figure 6:
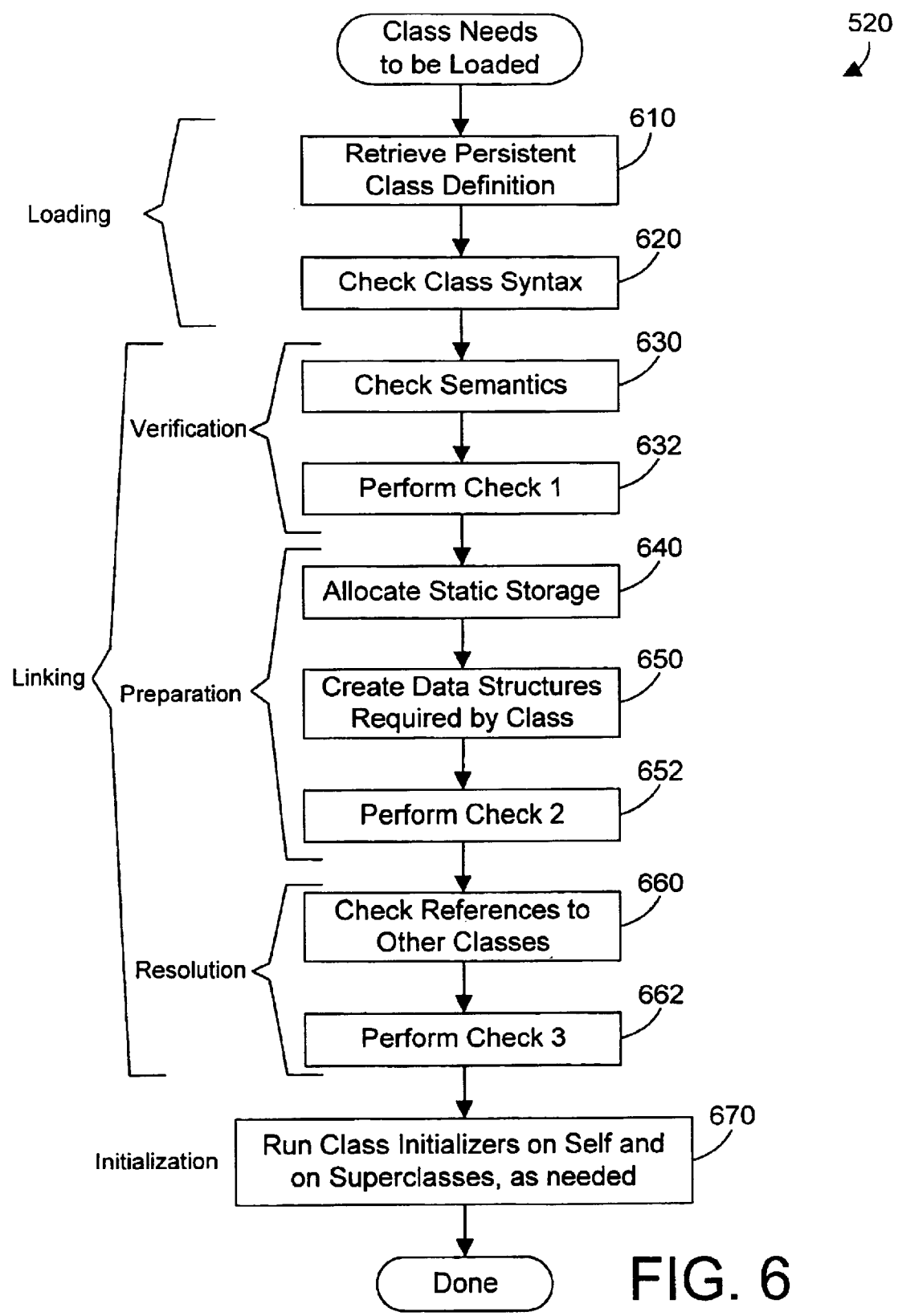
FIG. 6 is a flow diagram of a method in accordance with the preferred embodiments for a class loader to perform the step of loading a class in step 520 of FIG. 5.

The function of the new class loader in accordance with the preferred embodiments is shown as method 520 of FIG. 6. Note that several of the steps in method 520 correspond to method steps in method 220 of FIG. 3. In the preferred embodiments, these similar steps may correspond to the prior art steps in FIG. 3, or may alternatively correspond to new steps that incorporate new and different functions. Steps 610 and 620 are performed during the loading phase, and suitably correspond to steps 310 and 320 as described above with reference to FIG. 3. In the verification phase of FIG. 3, a single step 330 is used to check semantics. In method 520 of FIG. 6, the verification phase includes two steps, a check semantics step 630 and a separate step where a check of the class being loaded is performed (step 632). The check semantics step 630 suitably corresponds to step 330 in FIG. 3 as described above. However, the additional check 632 is performed to assure that, if the class is identified as a protected class, it appears in a catalog of allowable classes supplied with the JVM. Details of check 632 are described below with reference to FIG. 7.

The preparation stage of FIG. 6 includes a step 640 to allocate static storage and a step 650 to create data structures required by the class, similar to steps 340 and 350 in FIG. 3. However, in addition, the preparation phase includes a second check (step 652) that is performed to assure that if the superclass of the class being prepared is a protected class, the class being prepared is a protected class as well. Details of check 652 are described below with reference to FIG. 8.

The resolution phase checks references to other classes (step 660), similar to what was done in step 360 of FIG. 3. As with the prior art method, the resolution phase of method 520 may be performed when a class is loaded, but is preferably performed at runtime when a method on a class is first invoked. In the preferred embodiments, the resolution phase (whether performed when a class is loaded by the JVM or at runtime) includes an additional check (step 662) that is performed to assure that only system state classes are allowed to reference private domain classes. Details of check 662 are described below with reference to FIG. 9. The initialization step 670 is then performed, which is preferably similar to the corresponding step 370 in FIG. 3.

Figure 7:
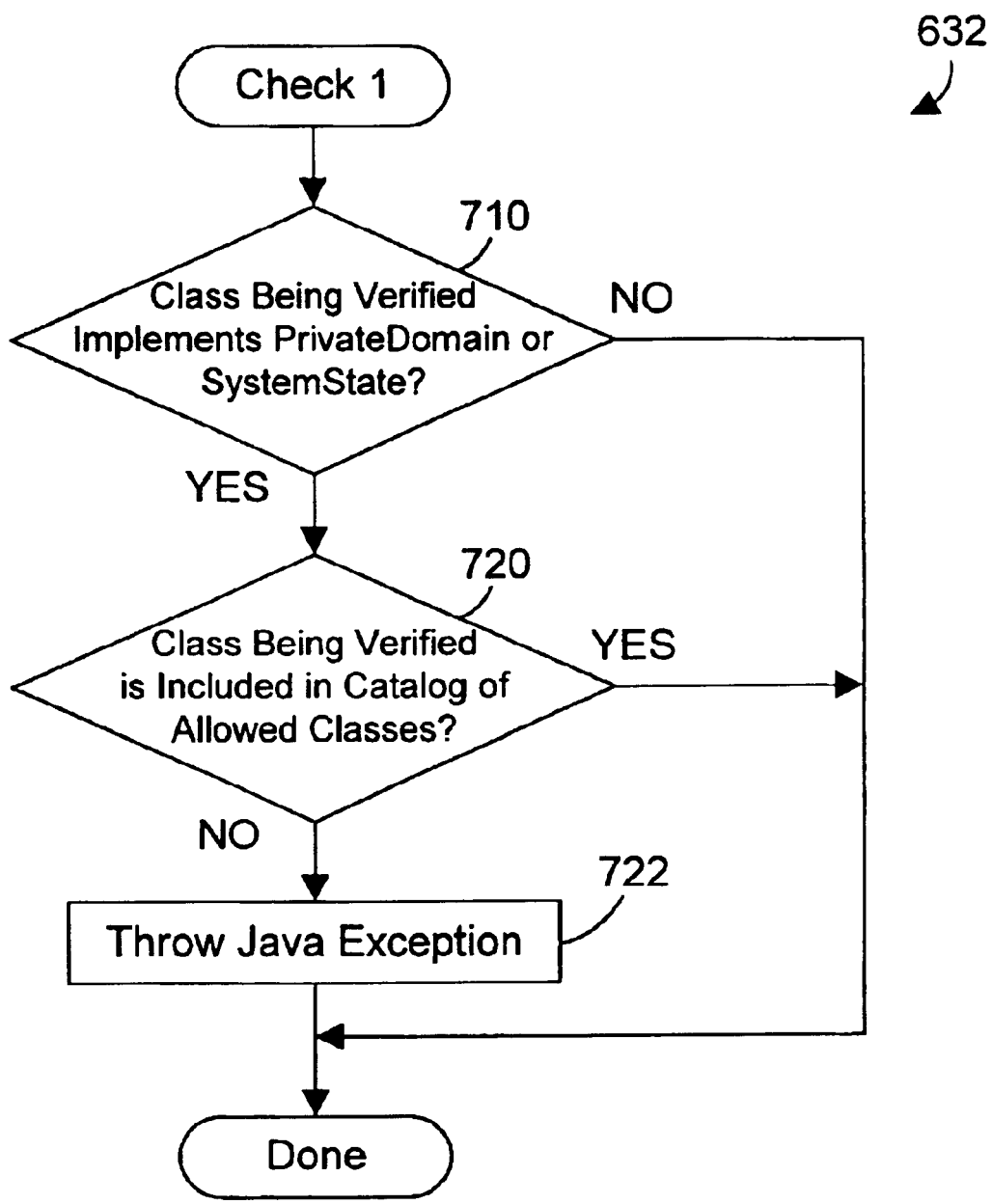
FIG. 7 is a flow diagram of one suitable method for performing check 1 in step 632 of FIG. 6.

Check 1 performed at step 632 of FIG. 6 is expanded into a method 632 containing several steps, as shown in FIG. 7. The class being verified is checked to see if it implements the PrivateDomain interface or the SystemState interface (step 710). If not (step 710=NO), check 1 is done because the class being verified is not a protected class. However, if the class being verified implements PrivateDomain or SystemState (step 710=YES), this means that the class being verified is a protected class, and further checks are required to see if the class being verified is a class that was provided with the JVM in the system level code. If the class being verified is included in a catalog of allowed classes (step 720=YES), this means that the class being verified, which is a protected class, is a system level Java class that was supplied with the JVM, which is what we expect for normal operation. However, if the class being verified is not included in the catalog of allowed classes (step 720=NO), a Java exception is thrown (step 722). Note that this exception is thrown when a class appears to be protected by implementing either or both of PrivateDomain and SystemState, but is not included in the catalog of allowed classes. The only way this can happen is for a programmer to define a class that implements PrivateDomain or SystemState, thereby attempting to gain access to the system level Java code. However, this user-defined class will not be in the catalog of allowed classes, so check 1 shown as method 632 of FIG. 7 will throw a Java exception in step 722 to prevent the class from being used.

Figure 8:
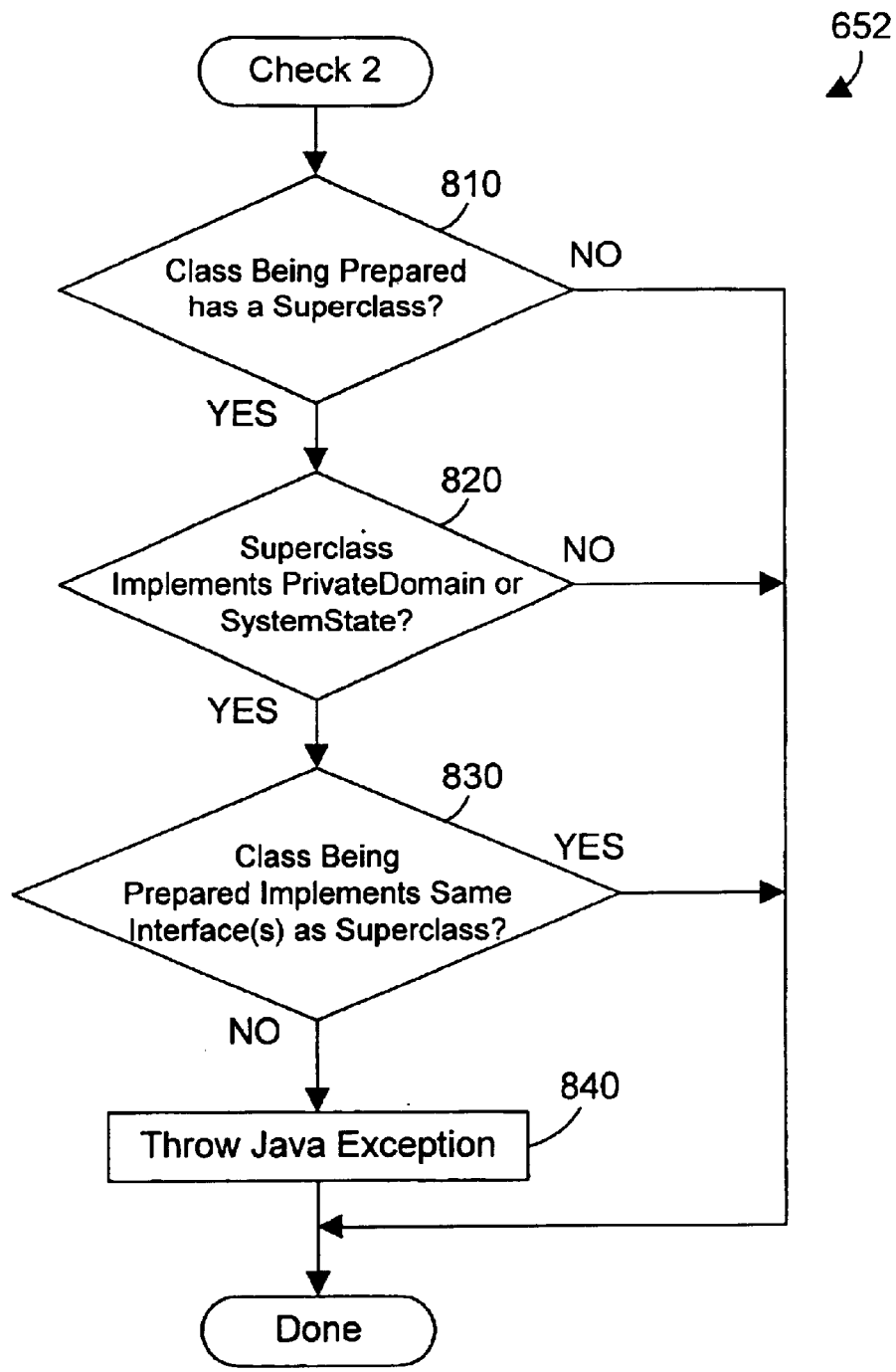
FIG. 8 is a flow diagram of one suitable method for performing check 2 in step 652 of FIG.6.

Check 2 performed at step 652 of FIG. 6 is expanded into a method 652, as shown in FIG. 8. The class being prepared is checked to see if it has a superclass (step 810). If not (step 810=NO), check 2 is done because check 2 is only concerned with superclasses. If the class being prepared has a superclass (step 810=YES), check 2 then checks to see if the superclass implements the PrivateDomain or SystemState interfaces (step 820). If not (step 820=NO), check 2 is done. If so (step 820=YES), method 652 then determines whether the class being prepared implements at least the same protected interfaces as the superclass (step 830). If so (step 830=YES), check 2 is done. If not (step 830=NO), a Java exception is thrown (step 840). Note that step 820 does not check for an exact match between the interface of the class being prepared and its superclass. Step 820 simply determines whether the class being prepare implements any and all protected interfaces that the superclass implements. Thus, if the superclass implements the PrivateDomain interface, the class being prepared must implement the PrivateDomain interface, but it may implement the SystemState interface as well. If the superclass implements the SystemState interface, the class being prepared must implement the SystemState interface, but it may implement the PrivateDomain interface as well. If the superclass implements both the PrivateDomain and SystemState interfaces, the class being prepared must implement both the PrivateDomain and SystemState interfaces as well. Check 2 as shown as method 652 of FIG. 8 checks to see if a programmer has subclassed from a protected class without implementing the same protected interfaces as the superclass. Again, this may occur when a programmer attempts to gain access to system level Java code through inheritance by subclassing from a system level Java class.

Figure 9:
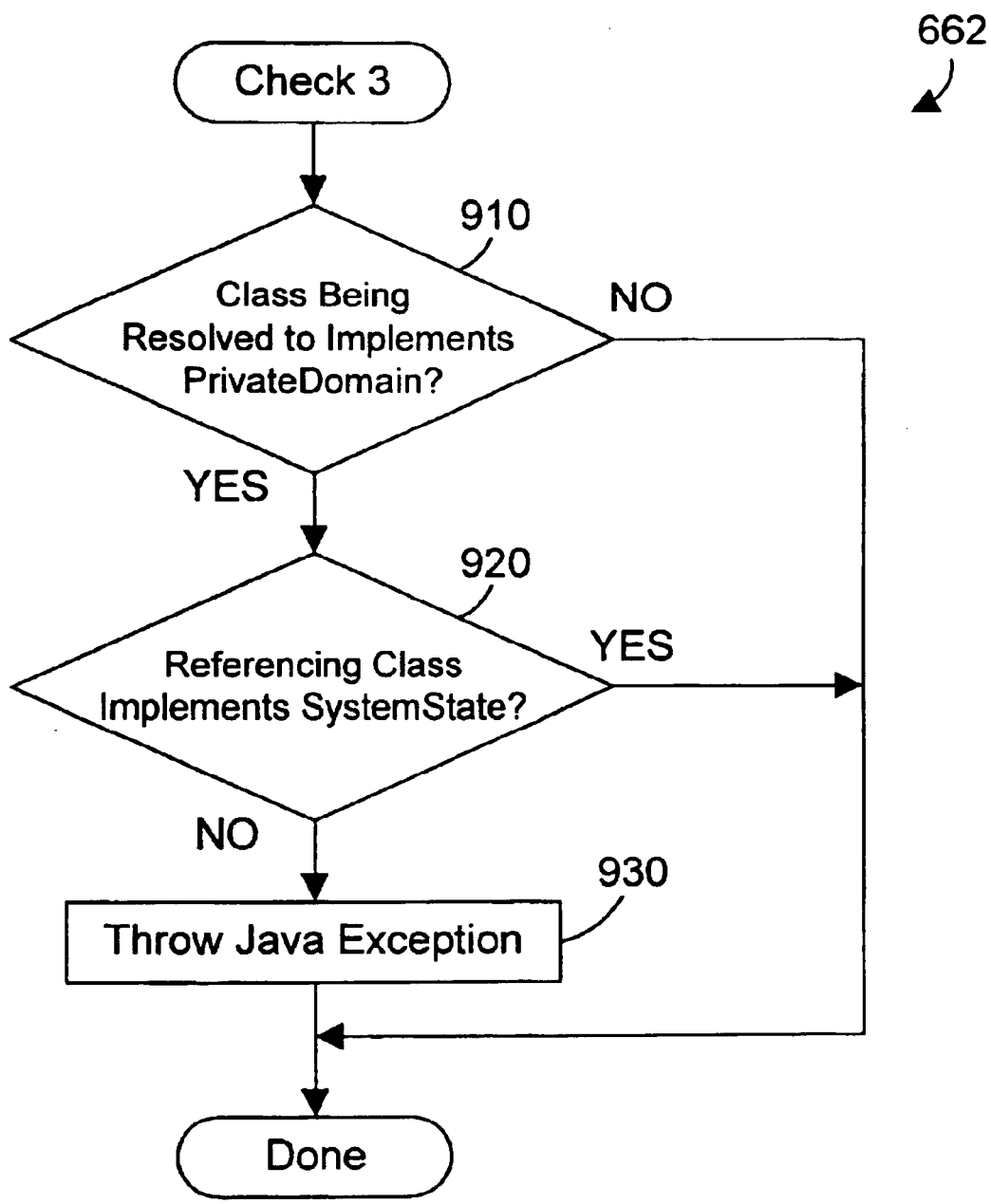
FIG. 9 is a flow diagram of one suitable method for performing check 3 in step 662 of FIG. 6.

Check 3 performed at step 662 of FIG. 6 is expanded into a method 662, as shown in FIG. 9. During resolution, all classes that are referenced by the class being loaded are checked. For our discussion herein, the referenced classes are the classes being "resolved to." The class being resolved to is checked to see if it implements the PrivateDomain interface (step 910). If not (step 910=NO), check 3 is done. If so (step 910=YES), check 3 determines whether the referencing class implements the. SystemState-interface (step 920). If so (step 920=YES), check 3 is done. If the referencing class does not implement the SystemState interface (step 920=NO), a Java exception is thrown (step 930). Check 3 thus assures that any class that has a reference to a class that implements PrivateDomain must implement SystemState. In other words, only a system state class can access a private domain class.

Figure 10:
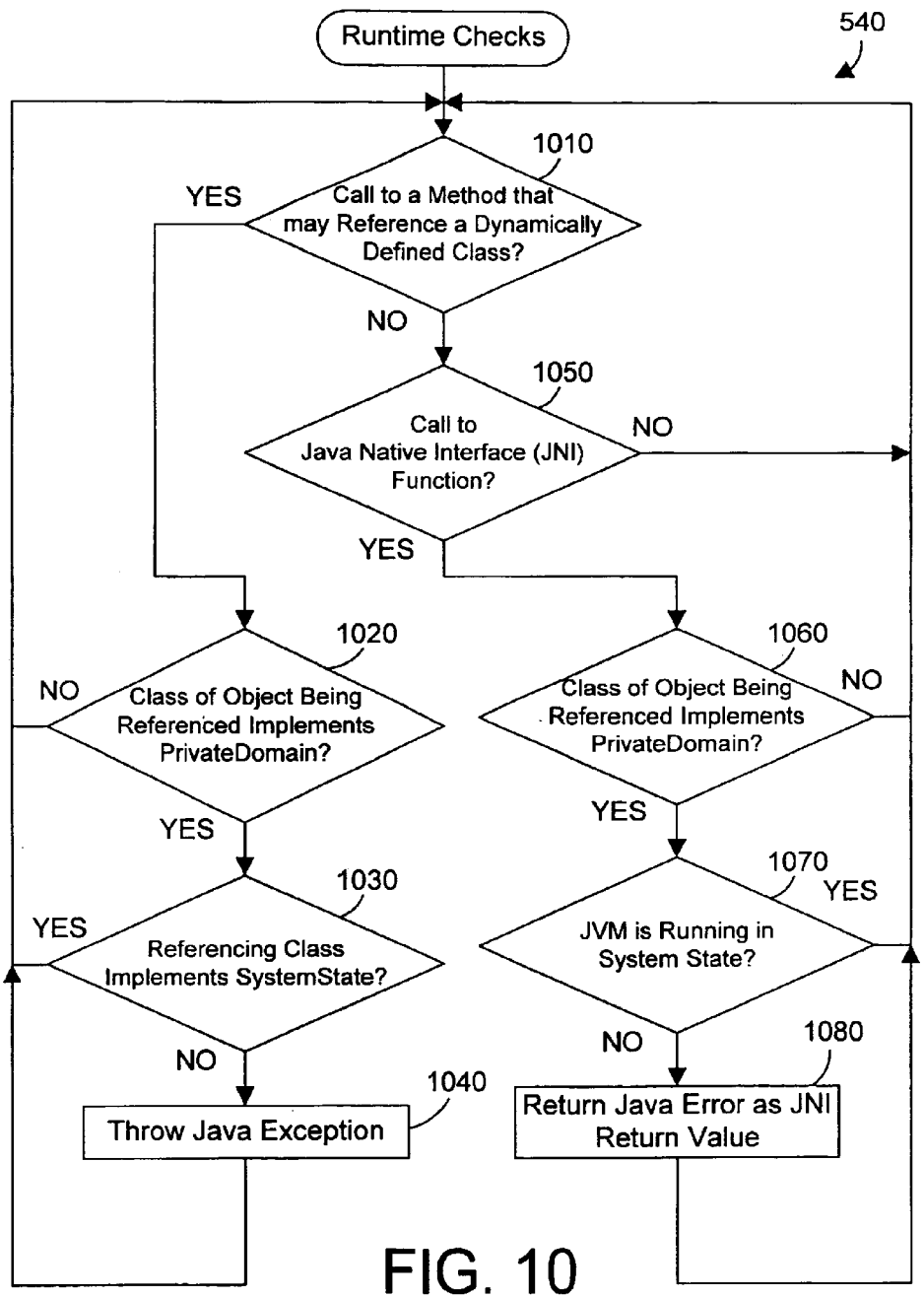
FIG. 10 is a flow diagram of one suitable method for performing the runtime checks in step 540 of FIG. 5.

Referring again to FIG. 5, in addition to the checks performed when loading the class during step 520, method 500 also performs runtime checks (step 540) to verify that system level Java classes are not accessed by unauthorized code. Examples of two suitable runtime checks are shown as method 540 in FIG. 10. The first of these checks deals with invoking methods that may reference a dynamically-defined class. Certain reflection methods are defined in Java that can take a class as a parameter, and perform functions on that class without knowing until run-time which class to access. A clever programmer might attempt to access system level code via this "back door" by passing a system level class as a parameter to a Java reflection method, so a runtime check is needed to prevent the user from accessing a system level class by passing the class as a parameter when invoking a method that may reference a dynamically-defined class. Thus, at runtime, if a call is made to a method that allows referencing a dynamically-defined class (step 1010=YES), checks are needed to assure that the calling program is not attempting to gain unauthorized access to system level code. Method 540 checks to see if the class of the method being referenced implements the PrivateDomain interface (step 1020). If not (step 1020=NO), the class is not a protected class, so no further action is needed. If the class of the method being referenced implements PrivateDomain (step 1020=YES), method 540 then checks to see if the class that is calling the method (referred to as the "referencing class") implements the SystemState interface (step 1030). If so (step 1030=YES), the referencing class is authorized to access the method, and normal operation continues. If the referencing class does not implement the SystemState class (step 1030=NO), a Java exception is thrown (step 1040). As stated above, one particular case where a class may be dynamically defined is by calling the defineClass method in class java.lang.ClassLoader. FIG. 11 lists the defined Java reflection methods that can access a dynamically-defined class. Note that other methods may be developed in the future that allow accessing classes that are defined at run-time, and the preferred embodiments expressly extends to any such method. The check in steps 1010, 1020, 1030 and 1040 checks to see if the referenced class is a private domain class, and if so, makes sure that the referencing class is a system state class and is therefore authorized to access the private domain class.

Another runtime check is performed in steps 1050, 1060, 1070, and 1080. If the method call is not to a method that may access a dynamically defined class (step 1010=NO), method 540 then determines whether the call is to a Java Native Interface (JNI) function from a program external to the JVM (step 1050). Java defines JNI functions to allow non-Java languages, such as C++, to perform functions defined in Java. Examples of some JNI functions defined in the Java programming language are shown in FIG. 12. If the call is to a JNI function (step 1050=YES), method 540 checks to see if the class of the object being referenced implements the PrivateDomain interface (step 1060). If not (step 1060=NO), no further action is required, because the method is 25 not on a protected class. If so (step 1060=YES), method 540 checks to see if the JVM is running in a system state mode (step 1070). In the case of the AS/400, the system state of the JVM could be checked by reading the hardware process state indicator (see 112 in FIG. 1), which indicates that state for each process that is currently running, which would include the process executing the JVM. If the JVM is running in system state (step 1070=YES), then it is authorized to reference a private domain object or class, so no further action is required. However, if the JVM is not running in system state (step 1070=NO), a Java error is returned as the JNI return value (step 1080), signaling to the program that invoked the JNI function that the JNI function could not be performed as requested.

Runtime checks 540 are necessary to slam shut some potential back doors by which a programmer might be able to gain access to system level Java code. By providing runtime checks 540, a programmer's efforts to access system level code via Java reflection methods or JNI functions will not be successful. While the system will run without these runtime checks, the preferred embodiments includes these runtime checks to provide a more robust system that allows system level code in Java classes but protects those classes from many different types of unauthorized access.

Figure 13:
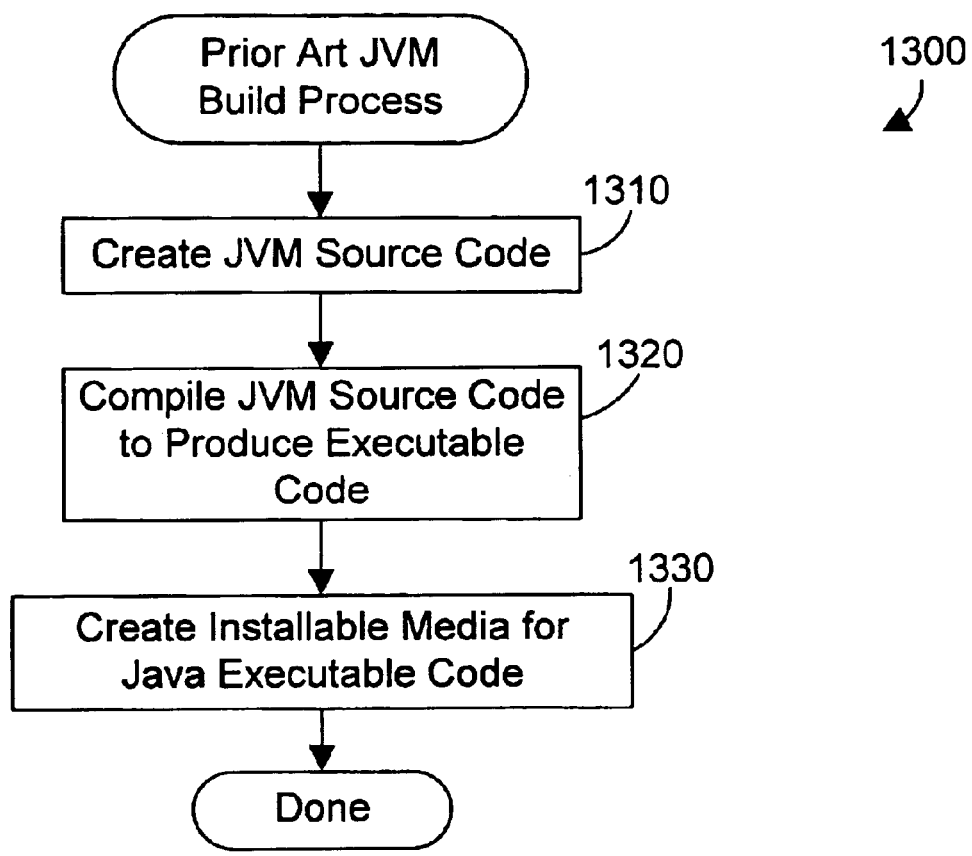
FIG. 13 is a prior art JVM build process.

The apparatus and method of the preferred embodiments requires a different JVM build process than is presently used in the prior art. Referring to FIG. 13, a prior art JVM build process 1300 begins by creating JVM source code (step 1310). The JVM source code is then compiled to produce an executable JVM (step 1320). Installable media is then created for the executable code (step 1330). Examples of installable media include: a floppy diskette; a CD ROM; a magnetic tape; an Internet connection; and an image on a network hard disk drive. Broadly speaking, the term "installable media" includes any and all media from which the executable code may be installed. Note that in the prior art, Java is typically not used for system level code because of the lack of protections, so the prior art build process 1300 is typically for applications written in Java, not system level code.

Figure 14:
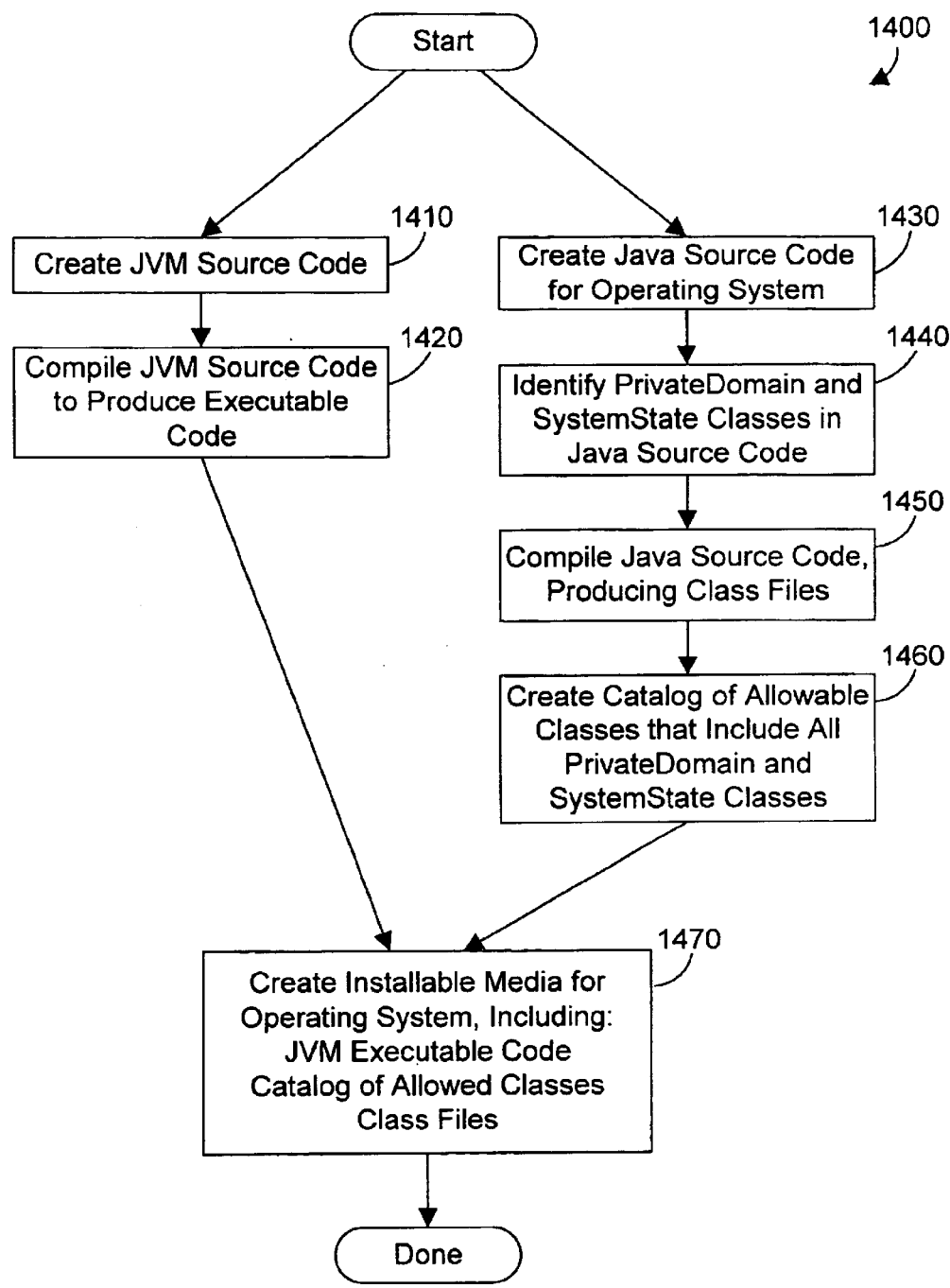
FIG. 14 is a JVM build process for system level code in accordance with the preferred embodiments.

Referring now to FIG. 14, a build process 1400 in accordance with the preferred embodiments takes additional steps over the prior art to build in adequate protections so that Java classes may be defined and used as system level code. Steps 1410 and 1420 are preferably the same steps as steps 1310 and 1320 in method 1300 of FIG. 13. However, in addition, steps 1430–1460 are also performed in the build process of the preferred embodiments. Java source code is created for the operating system (step 1430). The classes that the programmer would like to make private domain are defined to implement PrivateDomain. Likewise, those classes that the programmer would like to make system state are defined to implement the SystemState interface. Note that classes may be both private domain and system state. The programming of the classes thus defines which classes are private domain classes and which classes are system state classes (step 1440). As explained above, a class is marked as private domain by implementing the PrivateDomain abstract class, and a class is marked as system state by implementing the SystemState abstract class. The Java source code is then compiled, producing class files (step 1450). In the prior art, class files typically have a ".class" suffix or file extension. Next, a catalog of allowable classes is created that includes all private domain classes and system state classes (step 1460). The final step is to create installable media (step 1470). Note, however, that this installable media is more than JVM executable code in the prior art build process (see step 1330 of FIG. 13). The installable media includes the JVM executable code, the catalog of allowed classes created in step 1460, and the class files created in step 1450. By including all of these in the installable media, the class files can define system level classes that are loaded and executed by the JVM with the appropriate checks when classes are loaded and also at runtime. In addition, the catalog of allowable classes is provided, shown as 425 in FIG. 4, which is used in step 720 of check 1 shown in FIG. 7.

The preferred embodiments presented herein provide a significant advantage over the prior art by allowing system level Java code to be created and protected from unauthorized access. By providing protection for system level Java code, the Java programming language may now branch out into operating system applications as well as platform-independent applications.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to Java class in a JVM, the preferred embodiments are not limited to any particular object oriented language.

What is claimed is:

1. An apparatus comprising:
   at least one processor;
   a memory coupled to the at least one processor;
   a plurality of object oriented classes residing in the memory, at least one of the plurality of object oriented classes including state data that indicates a protected class;
   a catalog of allowed classes residing in the memory, the catalog of allowed classes including all classes that are authorized to access at least one protected class; and
   a state/domain checker residing in the memory and executed by the at least one processor, the state/domain checker performing a plurality of checks when each of the plurality of object oriented classes is loaded, the plurality of checks determining whether a class being loaded accesses the at least one protected class, and if so, determining whether the class being loaded is included in the catalog of allowed classes, and generating an exception if the class being loaded is not included in the catalog of allowed classes, wherein the state/domain checker further performs at least one runtime check when a method that may reference a dynamically defined class is invoked and when a function is invoked that could potentially access a method on one or more of the plurality of classes.

2. The apparatus of claim 1 wherein a class is a protected class if the class is defined as a private domain class or a system state class.

3. The apparatus of claim 1 wherein the plurality of checks includes a check during class verification that determines whether a class being verified implements a private domain interface or a system state interface, and if the class being verified implements a private domain interface or a system state interface, and if the class being verified is not included in the catalog of allowed classes, generating an error.

4. The apparatus of claim 1 wherein the catalog of allowed classes is generated during a build process that packages the plurality of classes together into an installable form.

5. The apparatus of claim 1 wherein the plurality of checks includes a check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, generating an error.

6. The apparatus of claim 1 wherein the plurality of checks includes a check during class resolution that determines whether a class being resolved to by a referencing class implements a private domain interface, and if the class being resolved to by the referencing class implements the private domain interface, and if the referencing class does not implement a system state interface, generating an error.

7. The apparatus of claim 6 wherein the check during class resolution is performed before runtime when a class is loaded.

8. The apparatus of claim 6 wherein the check during class resolution is performed at runtime when a method on the class being resolved to is invoked.

9. An apparatus comprising:
   at least one processor;
   a memory coupled to the at least one processor;
   a plurality of object oriented classes residing in the memory, at least one of the plurality of object oriented classes including state data that indicates a protected class;
   a state/domain checker residing in the memory and executed by the at least one processor, the state/domain checker performing a plurality of checks when each of the plurality of object oriented classes is loaded, the plurality of checks determining whether a class being loaded accesses at least one protected class, and if so, determining whether the class being loaded is authorized to access the at least one protected class, and generating an exception if the class being loaded is not authorized to access the at least one protected class, wherein the state/domain checker further-performs at least one runtime check when a method that may reference a dynamically defined class is invoked and when a function is invoked that could potentially access a method on one or more of the plurality of classes, wherein the at least one runtime check includes a check to determine whether a Java reflection method is invoked by a referencing class on a referenced class, and if a Java reflection method is invoked by the referencing class, and if the referenced class implements a private domain interface, and if the referencing class does not implement a system state interface, generating an error.

10. An apparatus comprising:
    at least one processor;
    a memory coupled to the at least one processor;
    a plurality of object oriented classes residing in the memory, at least one of the plurality of object oriented classes including state data that indicates a protected class;
    a state/domain checker residing in the memory and executed by the at least one processor, the state/domain checker performing a plurality of checks when each of the plurality of object oriented classes is loaded, the plurality of checks determining whether a class being loaded accesses at least one protected class, and if so, determining whether the class being loaded is authorized to access the at least one protected class, and generating an exception if the class being loaded is not authorized to access the at least one protected class, wherein the state/domain checker further performs at least one runtime check when a method that may reference a dynamically defined class is invoked and when a function is invoked that could potentially access a method on one or more of the plurality of classes, wherein the at least one runtime check includes a check to determine whether a Java Native Interface (JNI) function is invoked by an external program to access a protected class, and if the external program invokes a JNI function to access a protected class, and the external program is not running in system state, generating an error.

11. An apparatus comprising:

at least one processor;

a memory coupled to the at least one processor;

a plurality of Java classes residing in the memory, at least one of the plurality of Java classes including state data that indicates a protected class;

a Java Virtual Machine (JVM) residing in the memory and executed by the at least one processor;

a state/domain checker residing in the memory and executed by the at least one processor, the state/domain checker performing the following checks:

a first check during class verification that determines whether a class being verified implements a private domain interface or a system state interface, and if the class being verified implements a private domain interface or a system state interface, and if the class being verified is not included in a catalog of allowed classes that is generated during a JVM build process that packages the plurality of classes together into an installable form, throwing an exception;

a second check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, throwing an exception;

a third check during class resolution that determines whether a class being resolved to by a referencing class implements a private domain interface, and if the class being resolved to by the referencing class implements the private domain interface, and if the referencing class does not implement a system state interface, throwing an exception;

a fourth check to determine whether a Java reflection method is invoked by a referencing class on a referenced class, and if a Java reflection method is invoked by the referencing class, and if the referenced class implements a private domain interface, and if the referencing class does not implement a system state interface, throwing an exception; and a fifth check to determine whether a Java Native Interface (JNI) function is invoked by a program external to the JVM to access a protected class at runtime, and if the program invokes a JNI function to access a protected class, and the program is not running in system state, throwing an exception.

12. A method for creating and enforcing protected system level Java code comprising the steps of:

providing a catalog of allowed classes that includes all classes that are authorized to access at least one protected class;

loading a plurality of Java classes, each of the plurality of Java classes that is protected including state data that indicates a protected class; performing a plurality of checks when each of the plurality of Java classes is loaded, the plurality of checks determining whether the class being loaded accesses at least one protected class, and if so, determining whether the class being loaded is included in the catalog of allowed classes, and generating an exception if the class being loaded is not included in the catalog of allowed classes; and performing at least one runtime check when a method that may reference a dynamically defined class is invoked and when a function is invoked that could potentially access a method on one or more of the plurality of classes.

13. The method of claim 12 wherein a class is a protected class if the class is defined as a private domain class or a system state class.

14. The method of claim 12 wherein the plurality of checks includes a check during class verification that determines whether a class being verified implements a private domain interface or a system state interface, and if the class being verified implements a private domain interface or a system state interface, and if the class being verified is not included in the catalog of allowed classes, generating an error.

15. The method of claim 12 wherein the catalog of allowed classes is generated during a JVM build process that packages the plurality of classes together into an installable form.

16. The method of claim 12 wherein the plurality of checks includes a check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, generating an error.

17. The method of claim 12 wherein the plurality of checks includes a check during class resolution that determines whether a class being resolved to by a referencing class implements a private domain interface, and if the class being resolved to by the referencing class implements the private domain interface, and if the referencing class does not implement a system state interface, generating an error.

18. The method of claim 17 wherein the check during class resolution is performed before runtime when a class is loaded by a Java Virtual Machine (JVM).

19. The apparatus of claim 17 wherein the check during class resolution is performed at runtime when a method on the class being resolved to is invoked.

20. A method for creating and enforcing protected system level Java code comprising the steps of:

loading a plurality of Java classes, each of the plurality of Java classes that is protected including state data that indicates a protected class;

performing a plurality of checks when each of the plurality of Java classes is loaded, the plurality of checks determining whether the class being loaded accesses at least one protected class, and if so, determining whether the class being loaded is authorized to access the at least one protected class, and generating an exception if the class being loaded is not authorized to access the at least one protected class, performing at least one runtime check when a method that may reference a dynamically defined class is invoked and when a function is invoked that could potentially access a method on one or more of the plurality of classes, wherein the at least one runtime check includes a check to determine whether a Java reflection method is invoked by a referencing class on a referenced class, and if a Java reflection method is invoked by the referencing class, and if the referenced class implements a private domain interface, and if the referencing class does not implement a system state interface, generating an error.

21. A method for creating and enforcing protected system level Java code comprising the steps of:

loading a plurality of Java classes, each of the plurality of Java classes that is protected including state data that indicates a protected class;

performing a plurality of checks when each of the plurality of Java classes is loaded, the plurality of checks determining whether the class being loaded accesses at least one protected class, and if so, determining whether the class being loaded is authorized to access the at least one protected class, and generating an exception if the class being loaded is not authorized to access the at least one protected class, performing at least one runtime check when a method that may reference a dynamically defined class is invoked and when a function is invoked that could potentially access a method on one or more of the plurality of classes, wherein the at least one runtime check includes a check to determine whether a Java Native Interface (JNI) function is invoked by an external program to access a protected class, and if the external program invokes a JNI function to access a protected class, and the program is not running in system state, generating an error.

22. A method for creating and enforcing protected system level Java code comprising the steps of:

running a Java Virtual Machine (JVM);

the JVM loading a plurality of Java classes, each of the plurality of Java classes that is protected including state data that indicates a protected class;

performing a first check during class verification that determines whether a class being verified implements a private domain interface or a system state interface, and if the class being verified implements a private domain interface or a system state interface, and if the class being verified is not included in a catalog of allowed classes that is generated during a JVM build process that packages the plurality of classes together into an installable form, throwing an exception;

performing a second check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, throwing an exception;

performing a third check during class resolution that determines whether a class being resolved to by a referencing class implements a private domain interface, and if the class being resolved to by the referencing class implements the private domain interface, and if the referencing class does not implement a system state interface, throwing an exception;

performing a fourth check to determine whether a Java reflection method is invoked by a referencing class on a referenced class at runtime, and if a Java reflection method is invoked by the referencing class, and if the referenced class implements a private domain interface, and if the referencing class does not implement a system state interface, throwing an exception; and performing a fifth check to determine whether a Java Native Interface (JNI) function is invoked by a program external to the JVM to access a protected class at runtime, and if the program invokes a JNI function to access a protected class, and the program is not running in system state, throwing an exception.

23. A method for building a computer program that includes system level code, the method comprising the steps of:

generating Java source code for a plurality of object oriented classes, each of the plurality of object oriented classes that is protected including state data defined in the Java source code that indicates a protected class;

identifying from the Java source code for each object oriented class which of the plurality of object oriented classes are protected;

compiling the Java source code for the plurality of object oriented classes, thereby creating a plurality of class files that correspond to the plurality of object oriented classes;

creating a catalog of allowable classes, the catalog including all protected classes;

compiling source code for a Java Virtual Machine (JVM) to produce an executable JVM;

creating installable media that includes the executable JVM, the catalog of allowable classes, and the class files; and performing at least one runtime check when a method that may reference a dynamically defined class is invoked and when a function is invoked that could potentially access a method on one or more of the plurality of object oriented classes.

24. A computer-readable program product for checking a class being loaded, the program product comprising:

a state/domain checker that performs a plurality of checks when each of a plurality of object oriented classes is loaded, the plurality of checks determining whether a class being loaded accesses at least one protected class, and if so, determining whether the class being loaded is included in a catalog of allowed classes that includes all classes that are authorized to access at least one protected class, and generating an exception if the class being loaded is not included in the catalog of allowed classes, wherein the state/domain checker further performs at least one runtime check when a method that may reference a dynamically defined class is invoked and when a function is invoked that could potentially access a method on one or more of the plurality of classes; and computer readable signal bearing media bearing the state/domain checker.

25. The program product of claim 24 wherein said signal bearing media comprises recordable media.

26. The program product of claim 24 wherein said signal bearing media comprises transmission media.

27. The program product of claim 24 wherein a class is a protected class if the class is defined as a private domain class or a system state class.

28. The program product of claim 24 wherein the plurality of checks includes a check during class verification that determines whether a class being verified implements a private domain interface or a system state interface, and if the class being verified implements a private domain interface or a system state interface, and if the class being verified is not included in the catalog of allowed classes, generating an error.

29. The program product of claim 24 wherein the catalog of allowed classes is generated during a build process that packages the plurality of classes together into an installable form.

30. The program product of claim 24 wherein the plurality of checks includes a check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, generating an error.

31. The program product of claim 24 wherein the plurality of checks includes a check during class resolution that determines whether a class being resolved to by a referencing class implements a private domain interface, and if the class being resolved to by the referencing class implements the private domain interface, and if the referencing class does not implement a system state interface, generating an error.

32. The program product of claim 31 wherein the check during class resolution is performed before runtime when a class is loaded.

33. The program product of claim 31 wherein the check during class resolution is performed at runtime when a method on the class being resolved to is invoked.

34. A computer-readable program product for checking a class being loaded, the program product comprising:
a state/domain checker that performs a plurality of checks when each of a plurality of object oriented classes is loaded, the plurality of checks determining whether a class being loaded accesses at least one protected class, and if so, determining whether the class being loaded is authorized to access the at least one protected class, and generating an exception if the class being loaded is not authorized to access the at least one protected class, wherein the state/domain checker further performs at least one runtime check when a method that may reference a dynamically defined class is invoked and when a function is invoked that could potentially access a method on one or more of the plurality of classes, wherein the at least one runtime check includes a check to determine whether a Java reflection method is invoked by a referencing class on a referenced class, and if a Java reflection method is invoked by the referencing class, and if the referenced class implements a private domain interface, and if the referencing class does not implement a system state interface, generating an error; and
computer readable signal bearing media bearing the state/domain checker.

35. The program product of claim 34 wherein said signal bearing media comprises recordable media.

36. The program product of claim 34 wherein said signal bearing media comprises transmission media.

37. A computer-readable program product for checking a class being loaded, the program product comprising:
a state/domain checker that performs a plurality of checks when each of a plurality of object oriented classes is loaded, the plurality of checks determining whether a class being loaded accesses at least one protected class, and if so, determining whether the class being loaded is authorized to access the at least one protected class, and generating an exception if the class being loaded is not authorized to access the at least one protected class, wherein the state/domain checker further performs at least one runtime check when a method that may reference a dynamically defined class is invoked and when a function is invoked that could potentially access a method on one or more of the plurality of classes, wherein the at least one runtime check includes a check to determine whether a Java Native Interface (JNI) function is invoked by an external program to access a protected class, and if the external program invokes a JNI function to access a protected class, and the external program is not running in system state, generating an error; and
computer readable signal bearing media bearing the state/domain checker.

38. The program product of claim 37 wherein said signal bearing media comprises recordable media.

39. The program product of claim 37 wherein said signal bearing media comprises transmission media.

40. A computer-readable program product for checking a class being loaded, the program product comprising:
(A) a plurality of Java classes, at least one of the plurality of Java classes including state data that indicates a protected class;
(B) a Java Virtual Machine (JVM) executable program;
(C) a state/domain checker that performs the following checks:
(C1) a first check during class verification that determines whether a class being verified implements a private domain interface or a system state interface, and if the class being verified implements a private domain interface or a system state interface, and if the class being verified is not included in a catalog of allowed classes that is generated during a JVM build process that packages the plurality of classes together into an installable form, throwing an exception;
(C2) a second check during class preparation that determines whether a class being prepared has a superclass, and if the class being prepared has a superclass, and if the superclass implements a private domain interface or a system state interface, and if the class being prepared does not implement at least the same private domain interface or system state interface as the superclass, throwing an exception;
(C3) a third check during class resolution that determines whether a class being resolved to by a referencing class implements a private domain interface, and if the class being resolved to by the referencing class implements the private domain interface, and if the referencing class does not implement a system state interface, throwing an exception;
(C4) a fourth check to determine whether a Java reflection method is invoked by a referencing class on a referenced class at runtime, and if a Java reflection method is invoked by the referencing class, and if the referenced class implements a private domain interface, and if the referencing class does not implement a system state interface, throwing an exception;
(C5) a fifth check to determine whether a Java Native Interface (JNI) function is invoked by a program external to the JVM to access a protected class at runtime, and if the program invokes a JNI function to access a protected class, and the program is not running in system state, throwing an exception; and
(D) computer readable signal bearing media bearing the plurality of Java classes, the JVM executable program, and the state/domain checker.

41. The program product of claim 40 wherein said signal bearing media comprises recordable media.

42. The program product of claim 40 wherein said signal bearing media comprises transmission media.

* * * * *